Feb. 2, 1932. G. PIERETTI 1,843,626
RAVIOLI FORMER AND CUTTER
Filed Oct. 15, 1928 3 Sheets-Sheet 1
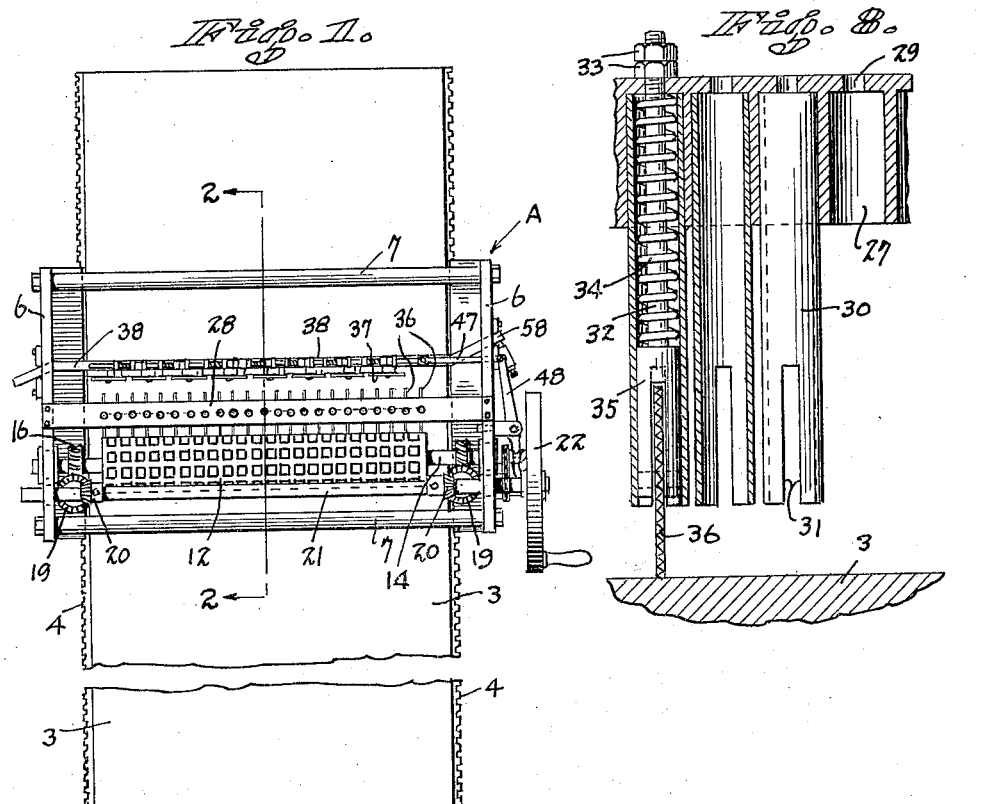
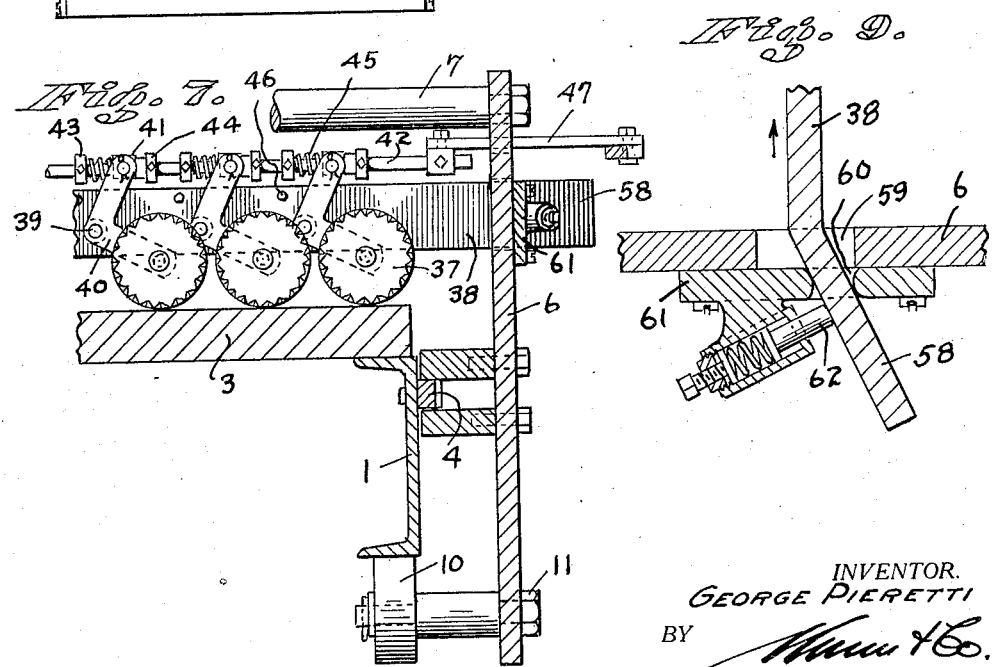
INVENTOR.
GEORGE PIERETTI
BY
ATTORNEYS.

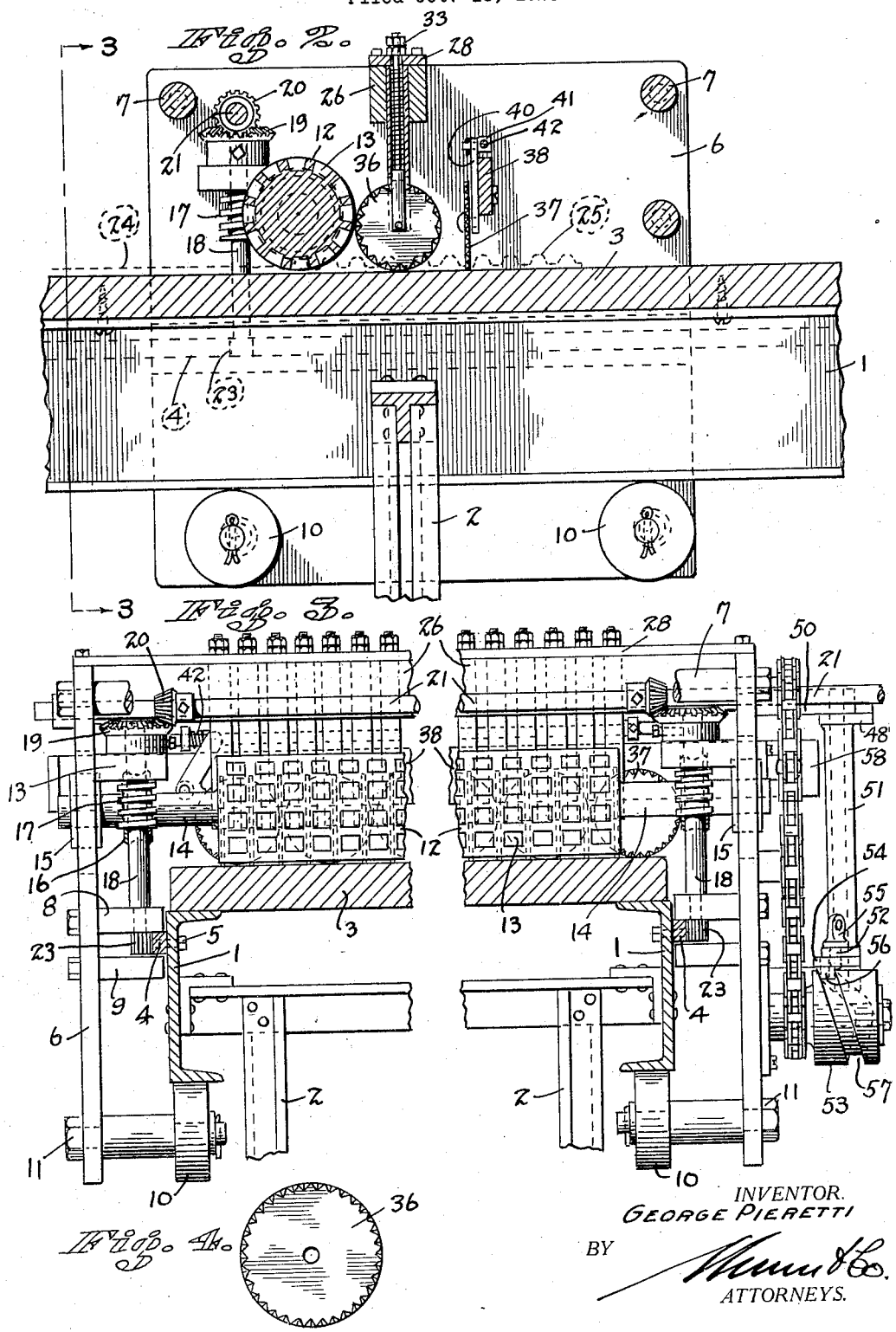

Feb. 2, 1932.  G. PIERETTI  1,843,626
RAVIOLI FORMER AND CUTTER
Filed Oct. 15, 1928  3 Sheets-Sheet 3
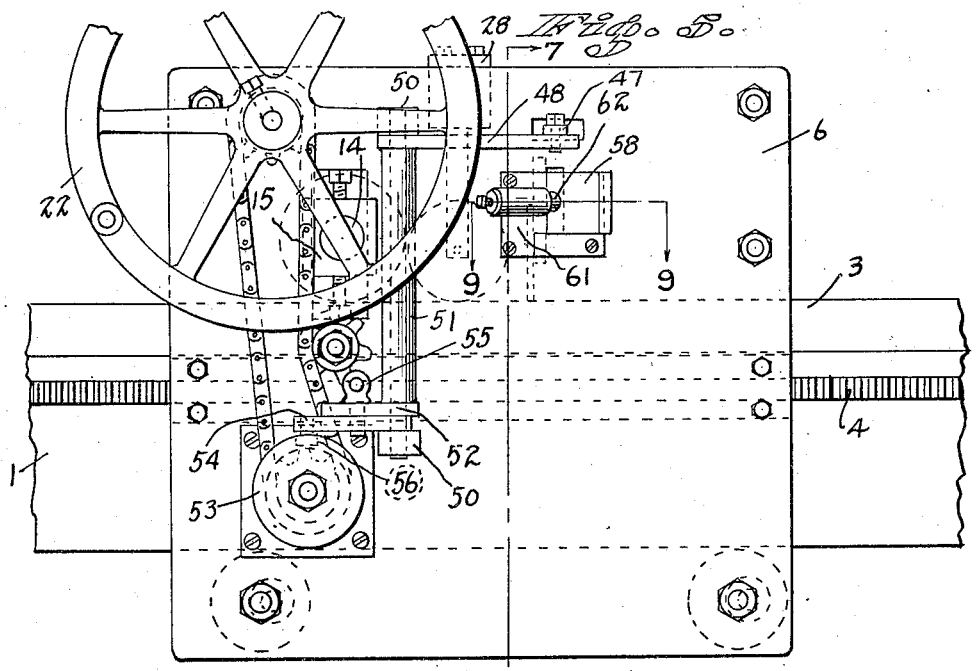
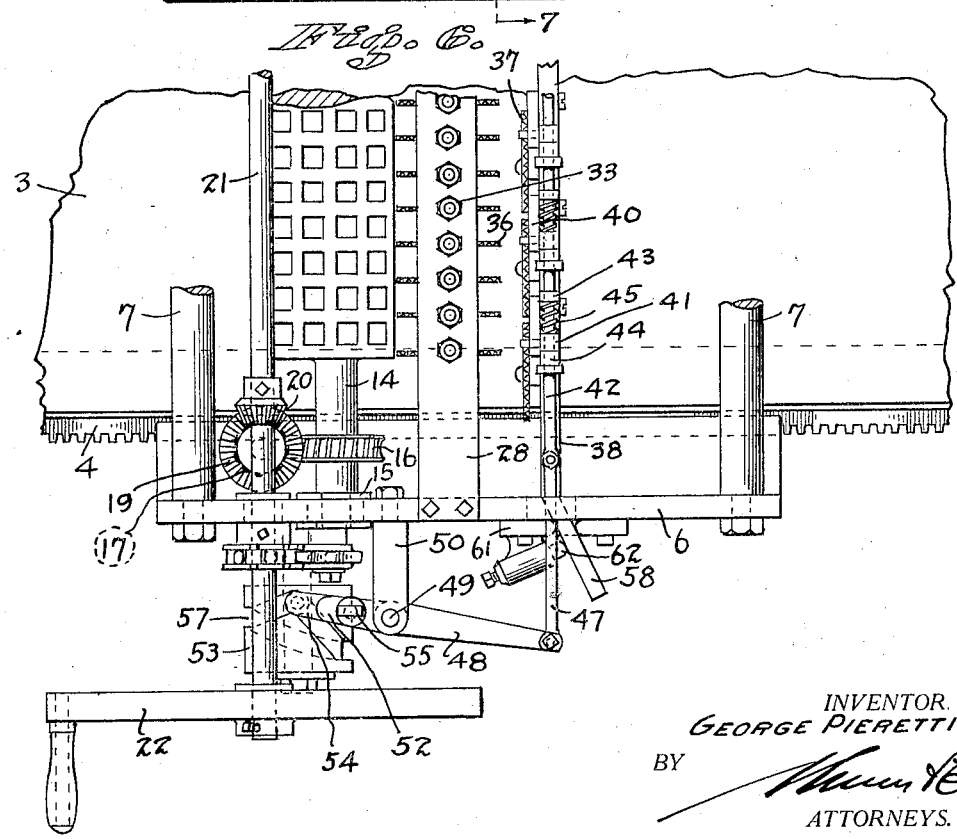
INVENTOR.
GEORGE PIERETTI
BY
ATTORNEYS.

Patented Feb. 2, 1932

1,843,626

UNITED STATES PATENT OFFICE

GEORGE PIERETTI, OF SAN FRANCISCO, CALIFORNIA, ASSIGNOR TO DELRAY CORPORATION, OF SAN FRANCISCO, CALIFORNIA, A CORPORATION OF CALIFORNIA

RAVIOLI FORMER AND CUTTER

Application filed October 15, 1928. Serial No. 312,660.

My invention relates to improvements in ravioli formers and cutters and it consists in the combinations, constructions and arrangements hereinafter described and claimed.

It is now the practice in making ravioli to lay a thin layer of dough on a table, then place a layer of meat upon the first layer, cover the layer of meat with a second layer of dough, and then run a cylinder over the top of the mass, this cylinder having square recesses for forming the ravioli. The squares thus formed are then severed from each other by operators who cut the dough with disc knives. This operation not only takes additional time, but it is practically impossible to form a perfectly straight cut that extends throughout the entire length of the dough.

It is the purpose of the present invention to combine the ravioli-forming mechanism with the cutting, so that both can be accomplished by a single operation and in a far more accurate way.

A further object of my invention is to provide a device of the type described which is simple in construction and which is durable and efficient for the purposes intended.

Other objects and advantages will appear in the following specification, and the novel features of the device will be particularly pointed out in the appended claims.

My invention is illustrated in the accompanying drawings forming a part of this application, in which Figure 1 is a top plan view of the device;
Figure 2 is a section along the line 2—2 of Figure 1;
Figure 3 is a section along the line 3—3 of Figure 2;
Figure 4 is a side view of one of the cutting discs;
Figure 5 is a side elevation of a portion of the machine;
Figure 6 is a top plan view of Figure 5;
Figure 7 is a section along the line 7—7 of Figure 5;
Figure 8 is a sectional view through a part of the device; and Figure 9 is a section along the line 9—9 of Figure 5.

In carrying out my invention, I provide a table that is composed of side channel irons 1 (see Figure 3), these channel irons being supported by legs 2. A table top 3 is carried by the channel irons and Figure 1 shows how the top is relatively long so as to accommodate sheets of dough having a large area.

The ravioli-forming and cutting mechanism is movable over the surface of the table and rides in racks 4 that are carried by the channel irons 1 and secured thereto by cap screws 5, or other suitable fastening means.

The carrier comprises a frame consisting of two side members 6 which are connected to each other by rods 7 (see Figure 1). Figures 2 and 3 show how the forming and cutting mechanism is mounted upon the table 3. Shoes 8 are secured to the members 6 and ride upon the tops of the racks 4. Shoes 9 extend below the racks as shown in Figure 3. Wheels 10 contact with the underside of the channel irons 1 and are secured to the sides 6 by bolts 11. It will be seen from this construction that the ravioli-forming and cutting mechanism indicated generally at A is movable from end to end over the table top 3. It should be noted that the wheels 10 are eccentrically mounted upon the bolts 11 (see Figure 2), so that any play may be taken up between the mechanism A and the table.

The members 6 carry a ravioli-forming cylinder 12 that has square recesses 13 formed therein. The cylinder is mounted upon a shaft 14 and the latter is journaled in bearings 15 carried by the sides 6. The cylinder extends from side to side of the table top 3 and it is rotated by a mechanism now to be described.

In Figure 3, I show the shaft 14 as being provided with two worm gears 16. These gears mesh with worms 17 and the latter are carried by shafts 18. At the tops of the shafts, I mount bevel gears 19 that are in mesh with bevel gears 20. Figure 1 shows how the gears 20 are mounted upon a shaft 21 that is journaled in the sides 6. One end of the shaft 21 carries a crank wheel 22. A turning of this crank wheel will rotate the cylinder 12.

A turning of the crank wheel will also advance the mechanism A along the table. This is accomplished by pinions 23 (see Figure 3) carried by the shafts 18 and meshing with the racks 4. The gearing is so arranged as to have no slippage between the cylinder 12 and the table top 3. Reference to Figure 2 shows the dough 24 laid upon the table top 3 and shows how this dough is formed into squares as at 25.

After the ravioli have been formed, they are cut into squares. The longitudinal cutters are shown in Figures 2, 6 and 8. The side members 6 carry a cross piece 26 that has a plurality of bores 27 cut therein. A cover plate 28 overlies the piece 26 and has small openings 29 that are concentrically disposed with respect to the bores 27 (see Figure 8). In each bore 27, I mount a cylinder 30, this cylinder having a bifurcated lower end 31. In each cylinder, I mount a rod 32 that extends up through the opening 29 and is secured in place by nuts 33. A spring 34 is mounted upon the rod 32 and bears against a plunger 35 disposed in the lower end of the rod. The spring 34 yieldingly holds a cutter 36 down upon the surface of the table top 3.

Figure 1 shows how the cutters 36 are spaced a sufficient distance from each other to cut between the ravioli. Reference to Figure 4 shows how the cutting edge of each cutter 36 is scalloped so as to crimp the edges of the ravioli while cutting it. This causes the upper layer of dough to adhere to the lower layer. As already stated, the cutters 36 cut longitudinally along the strips of dough.

I provide a plurality of cutters 37 (see Figure 7) for cutting transversely. These cutters are pivotally connected to a movable carrier 38 at 39. The bell crank levers 40 that connect the cutters 37 to the carrier 38 have their free ends connected to collars 41, the latter being loosely mounted upon a rod 42. The collars 41 are limited in their movements by fixed collars 43 and 44. Springs 45 urge the collars 41 against the collars 44. Pins 46 mounted on the carrier 38 limit the movement of the bell crank levers to the left in Figure 7.

The rod 42 is connected to a link 47 and Figure 6 shows how this link is connected to a lever 48, the latter being pivotally mounted at 49 on a bracket 50 that is carried by one of the sides 6. Figure 5 shows a sleeve 51 connecting the two arms of the lever 48 together. This is for the purpose of disposing the lower arm 52 directly above a cam sleeve 53 (see Figures 3 and 6). The arm 52 may be removably connected to an arm 54 by means of a pin 55. The arm 54 has a cam follower 56 that rides in the cam groove 57 in the member 53. The groove is so arranged as to cause a swinging of the lever 48 and a reciprocation of the rod 42. This reciprocation is sufficient to cause the cutters 37 to overlap each other so as to provide a continuous transverse cut in the dough.

I provide means for moving the carrier 38 longitudinally with respect to the mechanism A so that the carrier will have a relatively stationary position with respect to the longitudinal direction of the table and yet at the same time it will have a transverse movement, so as to cause the cutters to make a transverse cut without the necessity of bringing the mechanism A to a complete stop. It will be noted that the dough remains in a fixed position upon the table top and that the cutters 37 should not have a movement in the direction of the length of the table while they are cutting. In Figures 1 and 9, I show the carrier 38 as having bent ends 58 that are slidably received in slots 59 in the members 6. They are also slidably received in guide openings 60 in brackets 61. It will be noted that a movement of the carrier 38 in the direction of the arrow shown in Figure 9 will cause it to move to the left with respect to the members 6, this being due to the inclined end 58. The cutters 37 are moved into an inactive position just prior to the movement of the carrier as hereinafter described. The movement of the carrier is so arranged as to cause this movement to the left relative to the members 6 to be equal to the movement of the members 6 over the table top in the same direction. In other words, the carrier will move twice as fast relative to the table 3 during this part of the operation as that of the members 6. When the carrier 38 is moved in the opposite transverse direction, it will remain above a fixed line in the table top for a certain time.

A movement of the rod 42 to the left in Figure 7 will cause the cutters to ride free of the table and to move the carrier 38 into a position overlying the next cut to be made in the dough.

A reverse movement of the rod 42 will swing the cutters 37 into operative position and will permit a relative movement to take place between the mechanism A and the cutters 37, so that a straight cut may be effected. A spring-pressed pin 62 frictionally engages with one of the inclined ends 58 so as to permit the cutters 37 to be raised from their work before the carrier 38 is moved.

From the foregoing description of the various parts of the device, the operation thereof may be readily understood.

The cylinder 12 and the cutters 36 and 37 co-operate so as to form the dough into squares and to sever these squares from each other. The mechanism A is adapted to move throughout the entire length of the table top and to form and cut the dough in the manner set forth. After a complete operation, two new sheets of dough with their filling may be placed upon the table top and the same work done over again.

Although I have shown and described one embodiment of my invention, it is to be understood that the same is susceptible of various changes, and I reserve the right to employ such changes as may come within the scope of the appended claims.

I claim:

1. A ravioli former and cutter comprising a support for the dough, a ravioli-forming device movable over the dough and having recesses for forming the dough into ravioli connected together, and cutters for making longitudinal and transverse cuts in the dough between the ravioli, and means for moving the transverse cutters away from the ravioli-forming device at a speed to cause these cutters to make no longitudinal movement over the dough during their cutting action, but only a transverse movement.

2. A ravioli cutter comprising a support for dough, a frame movable along the support, a plurality of spring-pressed cutters carried by said frame for cutting the dough into longitudinal strips, a cutter carrier slidable in said frame, means for reciprocating said carrier, the ends of said carrier being bent and co-acting with said frame for causing said member to intermittently advance over the surface of the support during the continuous movement of the frame over the support, said carrier being movable in the direction of its length while remaining stationary with respect to the longitudinal length of the support, and on the return movement moving forwardly over the support, cutters and means connecting the cutters with said carrier for swinging them into cutting relation with the dough while the carrier is moving in the direction of its length, but not in the direction of the length of the support.

3. In a ravioli cutter, a support, a cutter carrier, a plurality of levers pivotally secured to said carrier, cutters carried by said levers, a rod secured to the other ends of said levers, means for reciprocating said rod, a frame movably supporting said carrier and being movable along the support, a friction shoe bearing against said carrier whereby said levers are moved before the carrier is moved, said support limiting the movement of the cutters and levers in one direction and stops disposed by said carrier for limiting the movement of the levers in the other direction.

4. In a ravioli cutter, a support for dough already formed into ravioli connected together, a cutter carrying frame, means for moving the frame over the formed ravioli from one end of the support to the other at a continuous speed, a member carried by the frame and extending transversely across the support, cutters carried by the member, means for initially moving the cutters into cutting position and then for moving them transversely with respect to the support until a continuous cut has been made across the dough, said means subsequently raising the cutters above the dough and then moving them in the opposite direction, said member being reciprocated by said cutter moving means and being shaped for guidance by slots in said frame so as to coincide with a fixed transversely extending line during the cutting movement and to move into a new cutting position during the return movement.

5. A ravioli cutter comprising a support for dough formed into ravioli connected together, a frame movable over the support at a continuous speed, cutters having their axes extending transversely to the direction of movement of the frame, said cutters being spaced for making longitudinal cuts between the rows of ravioli, a second set of cutters for making transverse cuts between the rows of ravioli, means for moving said last named cutters into cutting position and for moving the cutters transversely, a member for supporting the second set of cutters and being slidably carried by slots in said frame, the ends of said member being shaped and cooperating with the edges of the slots for causing the second set of cutters to move over a fixed transversely extending line during their cutting movement.

6. A cutter comprising a frame, means for continuously moving the frame along a material supporting surface, a carrier mounted on the frame, cutters supported by the frame carrier, means for imparting transverse movement to the cutters with respect to the line of movement of the frame, means cooperating with the carrier for allowing a relative longitudinal movement between the frame and the cutters during predetermined time periods for cutting operations, and for imparting additional movement to the carrier to compensate for the forward movement of the frame during the cutting operations.

7. A cutter comprising a frame, means for continuously moving the frame along a material supporting surface, a carrier mounted on the frame, cutters supported by the carrier, means for imparting transverse movement to the cutters with respect to the line of movement of the frame and having means associated therewith for lowering and raising the cutters, means cooperating with the carrier for allowing a relative longitudinal movement between the frame and the cutters during predetermined time periods for cutting operations, and for imparting additional movement to the carrier to compensate for the forward movement of the frame during the cutting operations.

8. A cutter comprising a cutter carrier intermittently movable along the length of a material supporting surface, cutters mounted on the carrier, and means for moving the cutters into cutting relation with the material, said cutter moving means moving the carrier transversely of the surface in one direction during the rest periods of the longitudinal movement of the carrier and advancing the carrier lengthwise of the surface during its return movement.

9. A cutter comprising a frame, means for moving the same continuously along the length of a material supporting surface, cutters carried by the frame for severing the material into strips when the frame is moved, a carrier supported by the frame and extending transversely of the surface, means for moving the carrier intermittently along the surface, cutters mounted on the carrier, means for moving the carrier endwise in one direction during the rest periods of its longitudinal movement, and means for moving the last-named cutters into cutting relation with the material.

10. A cutter comprising a frame, means for moving the same continuously along the length of a material supporting surface, cutters carried by the frame for severing the material into strips when the frame is moved, a carrier supported by the frame and extending transversely of the surface and being intermittently movable along the length of the surface, cutters mounted on the carrier and being movable into cutting relation with the material, means for moving the carrier endwise in one direction during the rest periods of its longitudinal movement and for advancing the carrier lengthwise of the surface when it is moved in the opposite direction.

11. A cutter comprising a carrier intermittently movable along a material supporting surface, aligned cutters mounted on the carrier, means for moving the cutters into cutting relation with the material and for moving the carrier transversely of the surface in one direction during the rest periods of the longitudinal movement of the carrier for producing a continuous transverse cut of the material, and means cooperating with the carrier for advancing the carrier lengthwise of the surface when the carrier is moved transversely in the opposite direction.

12. A cutter comprising a frame, means for continuously moving the same longitudinally along a material supporting surface, a carrier extending transversely to the frame, cutters mounted on the carrier, means for moving the cutters into cutting relation with the material, said means also including means for imparting endwise movement to the carrier, and means cooperating with the carrier-moving means for intermittently advancing the carrier lengthwise of the surface when the carrier is moved in one direction.

GEORGE PIERETTI.